US012522474B2

(12) United States Patent
Kashiwakura

(10) Patent No.: US 12,522,474 B2
(45) Date of Patent: Jan. 13, 2026

(54) ELEVATOR DOOR DEVICE

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 0 days.

(21) Appl. No.: 18/797,578

(22) Filed: Aug. 8, 2024

(65) Prior Publication Data

US 2025/0051137 A1 Feb. 13, 2025

(30) Foreign Application Priority Data

Aug. 10, 2023 (JP) ................................ 2023-131109

(51) Int. Cl.
*B66B 13/30* (2006.01)
*E05F 15/643* (2015.01)

(52) U.S. Cl.
CPC .......... *B66B 13/308* (2013.01); *E05F 15/643* (2015.01)

(58) Field of Classification Search
CPC ....... B66B 13/30; B66B 13/308; B66B 13/08; B66B 13/06; E05F 15/643; G06Q 10/08
See application file for complete search history.

(56) References Cited

U.S. PATENT DOCUMENTS 3,425,162 A * 2/1969 Ernst .................. E05D 15/0634
16/DIG. 34

FOREIGN PATENT DOCUMENTS

| | | | | | |
|---|---|---|---|---|---|
| CN | 104944262 | A | * | 9/2015 | ............ B66B 13/08 |
| JP | S62280183 | A | | 12/1987 | |
| JP | S63178284 | U | | 11/1988 | |
| JP | 2009051619 | A | * | 3/2009 | |
| JP | 2009249155 | A | | 10/2009 | |
| JP | 2010208761 | A | * | 9/2010 | |
| KR | 20090022262 | A | * | 3/2009 | ............ B66B 13/08 |
| KR | 20120133298 | A | * | 12/2012 | ............ B66B 13/08 |
| KR | 102507740 | B1 | * | 3/2023 | .......... B66B 13/301 |
| WO | WO-2012046289 | A1 | * | 4/2012 | ............ B66B 13/30 |
| WO | 2020084679 | A1 | | 4/2020 | |

* cited by examiner

*Primary Examiner* — Diem M Tran
(74) *Attorney, Agent, or Firm* — The Webb Law Firm

(57) ABSTRACT

The present invention provides an elevator door device including a door rail, a door part configured to move by rolling of a roller on the door rail, a door drive part, and a wear-debris adhesion suppression part extending in an opening and closing direction of the door part. The door drive part includes a motor part configured to drive and rotate a drive pulley, a driven pulley disposed apart from the drive pulley in the opening and closing direction, and an endless belt that is wound around the drive pulley and the driven pulley, and to which the door part is connected. The door rail is located below the drive pulley. The wear-debris adhesion suppression part is disposed between the drive pulley, and the door rail and the roller, and disposed at a position corresponding to the drive pulley in the opening and closing direction.

3 Claims, 22 Drawing Sheets

ELEVATOR DOOR DEVICE

CROSS-REFERENCE TO RELATED APPLICATION

This application claims priority to Japanese Patent Application No. 2023-131109 filed on Aug. 10, 2023, the disclosure of which is hereby incorporated by reference in its entirety.

BACKGROUND OF THE INVENTION

Field of the Invention

The present invention relates to an elevator door device.

Description of Related Art

Conventionally, there is known an elevator door device disposed in, for example, a car entrance (see WO 2020/084679 A1). As shown in FIG. 22, a door device 100 includes a door rail 101 that is mounted to a frame **100*b* disposed above a car entrance 100*a* and extends in an opening and closing direction (i.e., left-right direction in FIG. 22) of the car entrance 100*a*, door parts 102 that open and close along the door rail 101, and a door drive part 105 for driving the door parts 102** to open and close.

Each of the door parts 102 includes a door hanger 103 that has rollers **103*a* that roll on the door rail 101, and thereby move in the opening and closing direction, and a door panel 104 that hangs down from the door hanger 103**.

The door drive part 105 includes a motor 107 that has a drive pulley 106, a driven pulley 108 that is disposed apart from the drive pulley 106 in the opening and closing direction, and an endless belt 109 that is wound around the drive pulley 106 and the driven pulley 108. These drive pulley 106 and driven pulley 108 are disposed above the door rail 101 to be respectively located on both sides in the opening and closing direction of the car entrance **100*a***.

The door hanger 103 is connected to the endless belt 109 that is rotated by the motor 107 to move the door part 102 in the opening and closing direction.

In the door device 100, the door rail 101 is disposed below the drive pulley 106, and the roller **103*a* of the door part 102 rolls on this door rail 101 during opening and closing of the door part 102. There was a case where the belt 109 wears at its portion in contact with the drive pulley 106 due to the rotational driving force of the motor 107 during this time, and wear debris adheres to the door rail 101 or the roller 103*a*, which leads to difficulty in smooth opening and closing movement of the door part 102 along the door rail 101**.

SUMMARY OF THE INVENTION

It is therefore an object of the present invention to provide an elevator door device capable of suppressing the adhesion of abrasion powder of an endless belt to a door rail and a roller of a door part.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An elevator door device according to the present invention includes: a door rail extending in an opening and closing direction of a door panel; a door part including the door panel and a roller rotatable around a rotary shaft that extends orthogonal to the opening and closing direction and in a horizontal direction, the door part configured to move in the opening and closing direction by rolling of the roller on the door rail; a door drive part for driving the door part in the opening and closing direction; and a wear-debris adhesion suppression part that extends in the opening and closing direction, in which the door drive part includes: a motor part including a drive pulley and configured to drive to rotate the drive pulley; a driven pulley disposed apart from the drive pulley in the opening and closing direction; and an endless belt that is wound around the drive pulley and the driven pulley, and to which the door part is connected, the door rail is located below the drive pulley as viewed from the opening and closing direction, and the wear-debris adhesion suppression part is disposed between the drive pulley, and the door rail and the roller, as viewed from the opening and closing direction and disposed at a position corresponding to the drive pulley in the opening and closing direction.

In the elevator door device, the wear-debris adhesion suppression part can have a size in a rotary shaft direction of the roller large enough to cover the door rail and the roller when viewed downward from a position of the drive pulley.

The elevator door device can be configured to further include a frame member extending in the opening and closing direction, in which the frame member includes: a first part extending in a plane direction orthogonal to the rotary shaft direction of the roller and having a surface on one side in the rotary shaft direction on which the door rail is disposed; and a second part extending from an upper end of the first part toward the surface on the one side in the rotary shaft direction and extending in the opening and closing direction, and the second part forms the wear-debris adhesion suppression part.

In the elevator door device, a distal end part in the rotary shaft direction of the second part can extend downward or in an inclined direction in which the distal end part is inclined downward as it goes toward a distal side.

The elevator door device can be configured to further include a frame member extending in the opening and closing direction, in which the motor part is disposed on an upper end part of the frame member, and the wear-debris adhesion suppression part is disposed between the drive pulley and the upper end of the frame member in a vertical direction.

BRIEF DESCRIPTION OF THE DRAWINGS

The aforementioned features and the other features of the present invention will be clarified by the following description and figures illustrating the embodiments of the present invention.

DESCRIPTION OF THE INVENTION

Hereinafter, a description will be given on one embodiment of the present invention with reference to FIG. 1 to FIG. 2.

Figure 1:
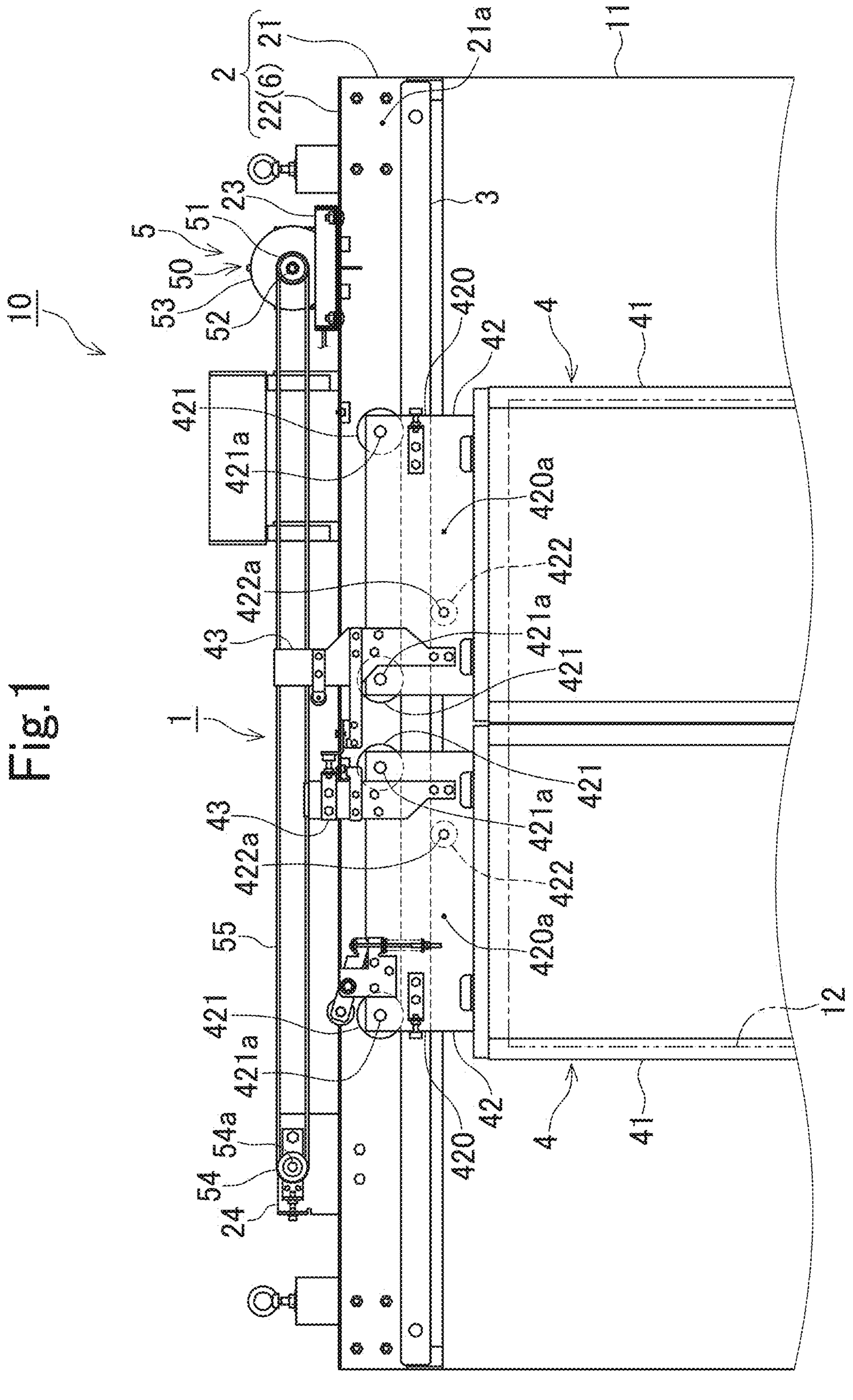
FIG. 1 is a schematic view showing a configuration of an elevator door device according to an embodiment of the present invention as viewed from an entrance direction of a car.
Figure 2:
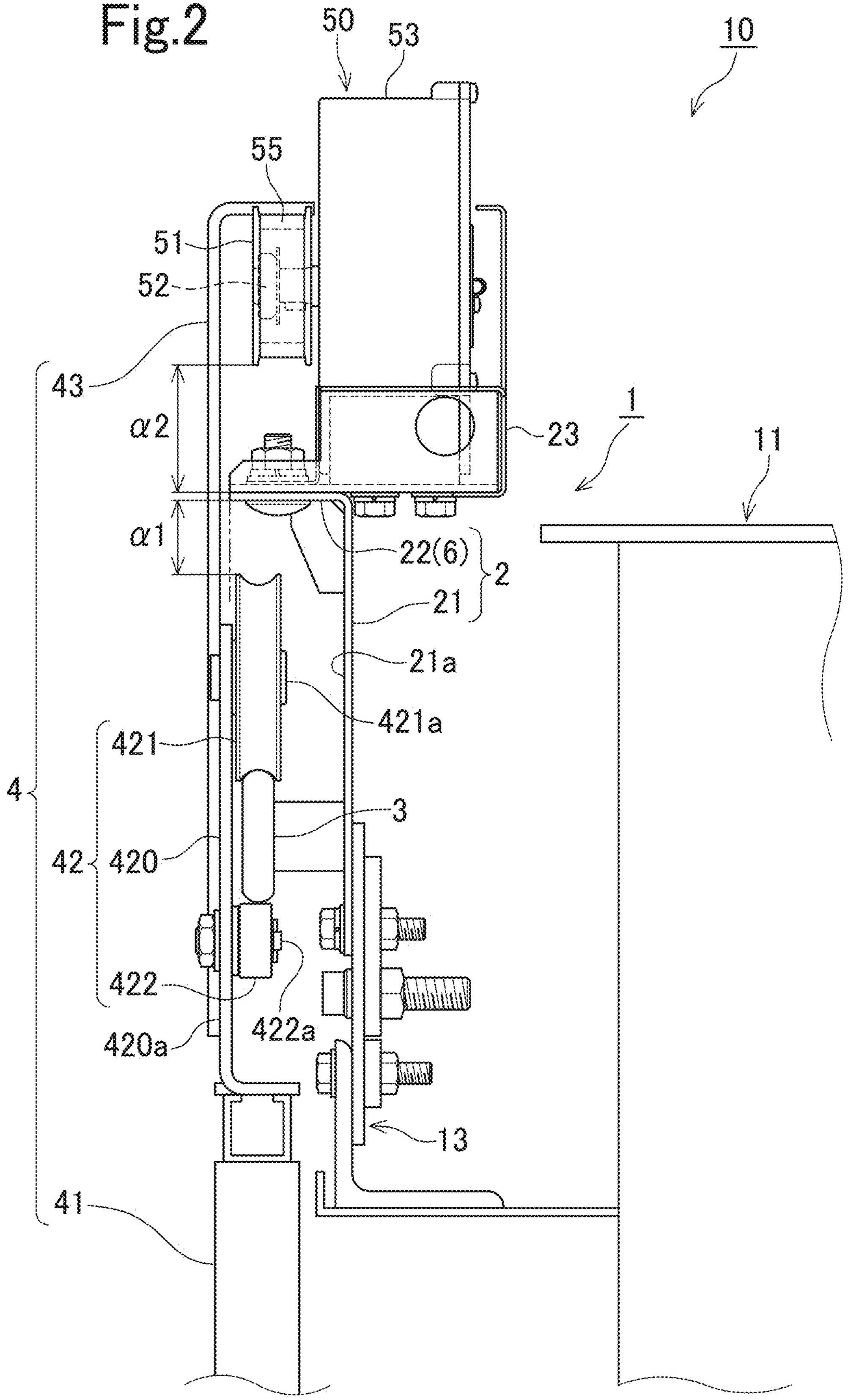
FIG. 2 is a view showing a configuration of a door drive part and its vicinity as viewed from an opening and closing direction of a car entrance.

As shown in FIG. 1, an elevator door device according to this embodiment (hereinafter also simply referred to as "door device") is disposed on an opening (i.e., car entrance) 12 of an elevator car body 11 to open and close the opening 12. An elevator car 10 of this embodiment thus includes the car body 11 and a door device 1.

Specifically, the door device 1 includes a frame member 2 disposed above the opening 12 in the car body 11. The door device 1 further includes a door rail 3 extending in an opening and closing direction (i.e., left-right direction in FIG. 1) of the opening 12, a door part 4 having a first roller (i.e., roller) 421 and configured to move in the opening and closing direction by rolling of the first roller 421, and a door drive part 5 for driving the door part 4 to open and close. The door device 1 further includes a wear-debris adhesion suppression part for preventing wear debris generated in the door drive part 5 from adhering to the door rail 3 and the first roller 42. This wear-debris adhesion suppression part 6 in the door device 1 of this embodiment is composed of a part (i.e., second part) 22 of the frame member 2. The door device 1 of this embodiment is a so-called center-opening type door device that includes two door parts 4 and allows the door parts 4 to move toward and away from each other to open and close the opening 12.

The frame member 2 extends in the opening and closing direction above the opening 12. Specifically, the frame member 2 includes, as is also shown in FIG. 2, a first part 21 extending in a plane direction orthogonal to an entrance direction of the opening 12 (i.e., left-right direction in FIG. 2) and a surface **21*a* on one side in the entrance direction on which the door rail 3 is disposed, and a second part 22 extending from an upper end of the first part 21 toward the surface 21*a* on one side in the entrance direction and extending in the opening and closing direction. The frame member 2 of this embodiment is formed by bending an upper end part of a band plate-shaped member extending in the opening and closing direction. This frame member 2 is mounted to the car body 11 above the opening 12 via a mounting member 13**.

Specifically, the first part 21 is a rectangular plate-shaped part elongated in the opening and closing direction. The size of this first part 21 in the opening and closing direction is the same as or larger than that of the car body 11 in the opening and closing direction.

The second part 22 is a band plate-shaped portion elongated in the opening and closing direction and continuously extends from one end to the other end in the opening and closing direction of the first part 21. The size in the entrance direction of the second part 22 of this embodiment is constant at any location in the opening and closing direction. This size of the second part 22 in the entrance direction is large enough to cover the door rail 3 and the first roller 421 rolling on the door rail 3 when viewed downward from above the second part 22. That is, the second part 22 extends from the upper end of the first part 21 to a position on one side in the entrance direction (i.e., the left side in FIG. 2) of the door rail 3 and the first roller 421. The distal end in the entrance direction of the second part 22 of this embodiment is located between a first bracket 43 of a door hanger 42 and the first roller 421 in the entrance direction.

The second part 22 of this embodiment is disposed at a position at which a distance al between the second part 22 and the first roller 421 (more specifically, the upper end of the first roller 421) in a vertical direction is smaller than a diameter of the first roller 421. The distance $\alpha$1 between the second part 22 and the first roller 421 in the vertical direction is smaller than a distance $\alpha 2$ between a drive pulley 51 (more specifically, the lower end of the drive pulley 51) and the second part 22.

Each of the two door parts 4 includes a door panel 41, the door hanger 42 for hanging the door panel 41, and the first bracket 43 for connecting the door hanger 42 to the door drive part 5.

The door panel 41 is a panel member extending in the plane direction orthogonal to the entrance direction and having a rectangular plate shape elongated in the vertical direction.

The door hanger 42 includes a hanger body 420 to which the door panel 41 is connected, the first roller (i.e., roller) 421 disposed on the hanger body 420 and configured to roll on the door rail 3, and a second roller 422 disposed on the hanger body 420 and configured to roll on the door rail 3 in contact with the same from below. The door hanger 42 of this embodiment includes two first rollers 421 and one second roller 422.

The hanger body 420 is a plate-shaped part connected to the upper end of the door panel 41 and extends upward from the upper end of the door panel 41. The hanger body 420 of this embodiment has a rectangular shape elongated in the opening and closing direction.

Each of the two first rollers 421 is disposed on the hanger body 420 to be rotatable around a first rotary shaft (i.e., rotary shaft) 421*a* extending in the entrance direction (that is, in a direction orthogonal to the opening and closing direction, and in a horizontal direction). These two first rollers 421 are disposed on the hanger body 420 to be located apart from each other in the opening and closing direction and allowed to be in contact with the door rail 3 from above.

The second roller 422 is disposed on the hanger body 420 to be rotatable around a second rotary shaft 422*a* extending in the entrance direction. This second roller 422 is disposed on the hanger body 420, while being in contact with the door rail 3 from below, so as to hold the door rail 3 between the first roller 421 and the second roller 422 in the vertical direction.

The first bracket 43 is a member extending upward from the hanger body 420, and the distal end of this first bracket 43 is connected to an endless belt 55 of the door drive part 5.

The door drive part 5 includes a motor part 50 including the drive pulley 51 and configured to drive to rotate the drive pulley 51, the driven pulley 54 disposed apart from the drive pulley 51 in the opening and closing direction, and the endless belt 55 wound around the drive pulley 51 and the driven pulley 54.

The motor part 50 is a drive source for moving the door part 4 in the opening and closing direction, and includes, specifically, the drive pulley 51 and a motor 53 having a drive shaft 52 for rotating the drive pulley 51. The drive shaft 52 extends in the entrance direction and is rotated by the motor 53. Thereby, the drive pulley 51 connected to the drive shaft 52 is rotated around the drive shaft 52. The drive pulley 51 of this embodiment is a pulley with a plurality of circumferentially aligned teeth on its periphery.

In the door device 1 of this embodiment, the door part 4 is held at a full-open position and a full-close position not by the mechanical mechanism such as a position holding mechanism, but by means of the torque of the motor 53 (that is, control of the motor 53).

This motor part 50 is disposed on an upper end part of the frame member 2. The moor part 50 of this embodiment is mounted to the upper end part of the frame member 2 (more specifically, the second part 22) via a second bracket 23. That is, the door device 1 of this embodiment also includes the second bracket 23 for mounting the motor part 50 to the frame member 2. Further, the motor part 50 is disposed on the outside of the opening 12 in the opening and closing direction (see FIG. 1). In this state, the drive pulley 51 is located above the door rail 3 as viewed from the opening and closing direction (see FIG. 2).

The driven pulley 54 is mounted on the upper end part of the frame member 2 via a third bracket 24 to be rotatable around a rotary shaft 54*a* extending in the entrance direction. This driven pulley 54 is disposed at the same position as the drive pulley 51 of the motor part 50 in the vertical direction. Further, the driven pulley 54 is disposed on the outside of the opening 12 (i.e., outside on the opposite side to the motor part 50 (drive pulley 51)) in the opening and closing direction. In this state, the driven pulley 54 is located above the door rail 3 as viewed from the opening and closing direction. The driven pulley 54 of this embodiment is a pulley with a plurality of circumferentially aligned teeth aligned on its periphery in the same manner as the drive pulley 51.

The endless belt 55 is wound around the drive pulley 51 and the driven pulley 54 disposed apart from each other in the opening and closing direction. The entire area in the opening and closing direction of the endless belt 55 in this wound state is located above the door rail 3 as viewed from the opening and closing direction (see FIG. 2). The first bracket 43 of the door part 4 on one side out of the two door parts 4 is connected to a portion on an upper side (i.e., upper portion) of the endless belt 55 between the two pulleys 51, 54, around which the endless belt 55 is wound, and the first bracket 43 of the door part 4 on another side out of the two door parts 4 is connected to a portion on a lower side (i.e., lower portion) of the endless belt 55. The endless belt 55 of this embodiment is a toothed belt.

The wear-debris adhesion suppression part 6 is a member or portion disposed between the endless belt 55, and the door rail 3 and the first roller 421 in the vertical direction to block the wear debris, for example, falling from the endless belt 55, to thereby suppress the wear debris from adhering to (i.e., reaching) the door rail 3 and the first roller 421. This wear-debris adhesion suppression part 6 is disposed at a position corresponding to at least the drive pulley 51 in the opening and closing direction, while being disposed between the drive pulley 51, and the door rail 3 and the first roller 421, as viewed from the opening and closing direction.

The wear-debris adhesion suppression part 6 of this embodiment is configured of a part of the frame member 2 (more specifically, the second part 22 of the frame member 2), as described above. Thus, the wear-debris adhesion suppression part 6 is formed within an area including the area, in which the endless belt 55 is disposed, in the opening and closing direction.

In the door device 1 configured as above, the motor 53 of the door drive part 5 drives to rotate the drive pulley 51 around the drive shaft 52, thereby rotating the endless belt 55 wound around the drive pulley 51 and the driven pulley 54, that is, moving the upper portion and the lower portion of the endless belt 55 in the opposite directions from each other in the opening and closing direction. Thereby, the door parts 4 (i.e., door panels 41) respectively connected to the upper portion and the lower portion are moved away from or toward each other along the door rail 3. As a result, the opening 12 of the car body 11 is opened and closed.

During this opening and closing operation of the door device 1, the teeth of the endless belt 55 and the teeth of the pulleys 51, 54 are meshed with each other to cause wear at portions of the endless belt 55 respectively corresponding to the pulleys 51, 54, which results in generation of wear debris. In particular, a significant amount of wear debris is generated at a portion of the endless belt 55 corresponding to the drive pulley 51, because the rotational driving force is transmitted from the motor 53 to that portion. The wear debris thus generated from the endless belt 55 falls downward.

At this time, the door device 1 of this embodiment includes: the door rail 3 extending in the opening and closing direction of the door panel 41; the door part 4 including the door panel 41 and the first roller (i.e., roller) 421 rotatable around the first rotary shaft 421*a* that extends orthogonal to the opening and closing direction and in the horizontal direction, the door part 4 configured to move in the opening and closing direction by rolling of the first roller 421 on the door rail 3; the door drive part 5 for driving the door part 4 in the opening and closing direction; and the wear-debris adhesion suppression part 6 (the second part 22 in the example of this embodiment) extending in the opening and closing direction. The door drive part 5 includes the motor part 50 including the drive pulley 51 and configured to drive to rotate the drive pulley 51, the driven pulley 54 disposed apart from the drive pulley 51 in the opening and closing direction, and the endless belt 55 that is wound around the drive pulley 51 and the driven pulley 54, and to which the door part 4 is connected. The door rail 3 is located below the drive pulley 51 as viewed from the opening and closing direction. The wear-debris adhesion suppression part 6 (i.e., the second part 22) is disposed between the drive pulley 51, and the door rail 3 and the first roller 421, as viewed from the opening and closing direction and disposed at a position corresponding to the drive pulley 51 in the opening and closing direction.

According to the configuration in which the wear-debris adhesion suppression part 6 (i.e., the second part 22) is thus disposed at a position corresponding to the drive pulley 51 and between the drive pulley 51, and the door rail 3 and the first roller 421 located below the drive pulley 51 in the opening and closing direction, it is possible to suppress wear debris, for example, falling from the endless belt 55 (i.e., from the portion wound around the drive pulley 51 and its vicinity) from adhering to the door rail 3 and the first roller 421.

In the door device 1 of this embodiment, the wear-debris adhesion suppression part 6 (i.e., the second part 22) is also disposed between the driven pulley 54, and the door rail 3 and the first roller 421 as viewed from the opening and closing direction and at a position corresponding to the driven pulley 54 in the opening and closing direction. Therefore, it is also possible to suppress wear debris, for example, falling from the endless belt 55 (i.e., the portion wound around the driven pulley 54 and its vicinity) from adhering to the door rail 3 and the first roller 421.

In the door device 1 of this embodiment, the wear-debris adhesion suppression part 6 (i.e., the second part 22) is disposed within the entire area in which the endless belt 55 is disposed in the opening and closing direction, and between the endless belt 55, and the door rail 3 and the first roller 421 as viewed from the opening and closing direction. Thereby, it is also possible to suppress wear debris, for example, falling from the endless belt 55 from adhering to the door rail 3 and the first roller 421 at any location with no pulleys 51, 54.

In the door device 1 of this embodiment, the wear-debris adhesion suppression part 6 (i.e., the second part 22) is disposed between the drive pulley 51 and the second roller 422 located below the drive pulley 51 as viewed from the opening and closing direction. Thereby, it is also possible to suppress wear debris, for example, falling from the endless belt 55 (i.e., the portion wound around the drive pulley 51 and its vicinity) from adhering to the second roller 422.

In the door device 1 of this embodiment, the wear-debris adhesion suppression part 6 has a size in the entrance direction (i.e., a direction in which a first rotary shaft (rotation shaft) 421 of the first roller 421 extends) large enough to cover the door rail 3 and the first roller (i.e., roller) 421 when viewed downward from the position of the drive pulley 51. Therefore, wear debris, for example, falling from the endless belt 55 (i.e., the portion wound around the drive pulley 51 and its vicinity) is unlikely to reach the door rail 3 and the first roller 421 located below the endless belt 55. Thereby, it is possible to effectively suppress the adhesion of wear debris to the door rail 3 and the first roller 421.

In the door device 1 of this embodiment, the wear-debris adhesion suppression part 6 has a size in the entrance direction large enough to cover also the second roller 422 when viewed downward from the position of the drive pulley 51. Therefore, wear debris, for example, falling from the endless belt 55 (i.e., the portion wound around the drive pulley 51 and its vicinity) is also unlikely to reach the second roller 422 located below the endless belt 55. Thereby, it is also possible to effectively suppress the adhesion of war debris to the second roller 422.

The door device 1 of this embodiment includes the frame member 2 extending in the opening and closing direction, and the frame member 2 includes: the first part 21 extending in a plane direction orthogonal to the first rotary shaft 421*a* direction of the first roller 421 and having the surface 21*a* on one side in the first rotary shaft 421*a* direction on which the door rail 3 is disposed; and the second part 22 extending from the upper end of the first part 21 toward the surface 21*a* on the one side in the first rotary shaft 421*a* direction and extending in the opening and closing direction. In the door device 1 of this embodiment, the second part 22 of the frame member 2 forms the wear-debris adhesion suppression part 6. The wear-debris adhesion suppression part 6 thus configured by utilizing a part (i.e., the second part) 22 of the member (i.e., the frame member) 2, in which the door rail 3 is disposed, enables to facilitate, for example, the reduction of the number of parts or members, and the simplified configuration.

The elevator door device according to the present invention is not limited to the aforementioned embodiments, and it is a matter of course that various modifications can be made without departing from the gist of the present invention. For example, the configuration of a particular embodiment can be added to the configuration of another embodiment, and a part of the configuration of a particular embodiment can be replaced with the configuration of another embodiment. In addition, a part of the configuration of a particular embodiment can be eliminated.

The door device 1 of the aforementioned embodiment is disposed on the car body to open and close the opening 12 of the car body 11, but not limited to this configuration. The door device 1 can be disposed in an opening of a landing floor (i.e., opening for communicating between the landing floor and the elevator shaft) to open and close the opening.

The door device 1 of the aforementioned embodiment is a so-called center-opening type door device, but not limited to this configuration. The door device 1 can be a so-called side-sliding type door device.

In the door device 1 of the aforementioned embodiment, the wear-debris adhesion suppression part 6 is configured by a part (i.e., the second part) 22 of the frame member 2, but not limited to this configuration. The wear-debris adhesion suppression part 6 can be configured by, for example, a part of another member or part other than the frame member, or may be configured by an individual part or member.

The wear-debris adhesion suppression part 6 is not limited to a specific shape. The wear-debris adhesion suppression part 6 (i.e., the second part 22) of the aforementioned embodiment extends from the first part 21 to the outside of the door rail 3 and the first roller 421 in the entrance direction, but not limited to this configuration. The wear-debris adhesion suppression part 6 can have any configuration as long as it extends to the position at which the distal end in the entrance direction of the wear-debris adhesion suppression part 6 partially overlaps with the door rail 3 and the first roller 421 when viewed downward from the upper position of the wear-debris adhesion suppression part 6. This configuration also allows the wear-debris adhesion suppression part 6 to prevent at least a part of wear debris, for example, falling from the endless belt 55 from heading to the door rail 3 and the first roller 421, and thereby suppress the wear debris from adhering to the door rail 3 and the first roller 421.

Figure 3:
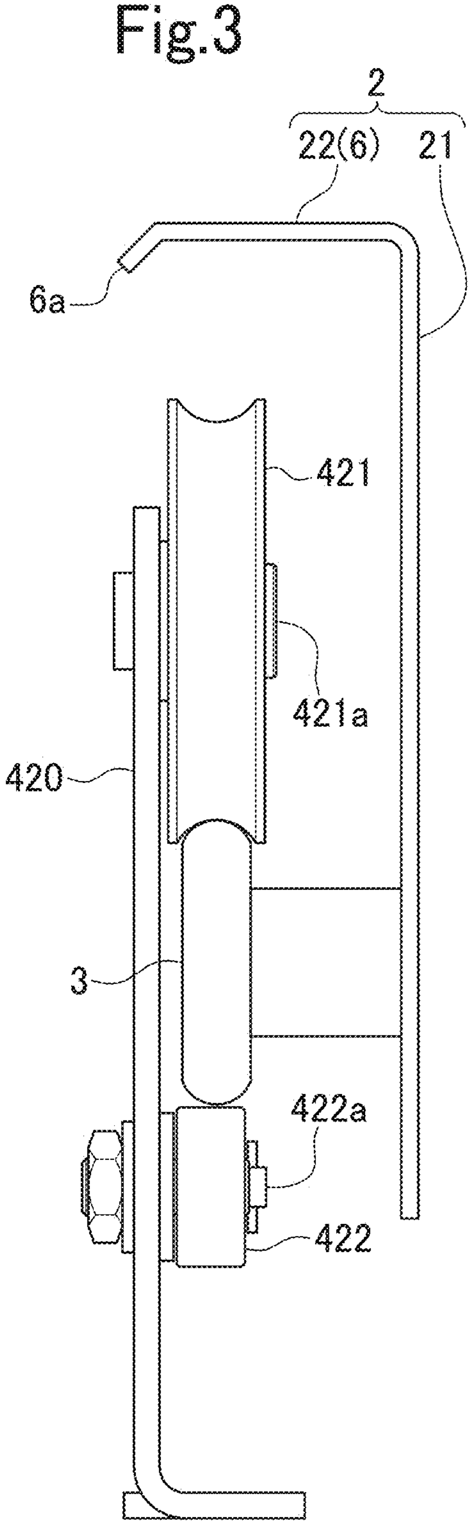
FIG. 3 is a view showing a configuration of a wear-debris adhesion suppression part, a door rail, a first roller, and their vicinities according to another embodiment as viewed from the opening and closing direction.
Figure 4:
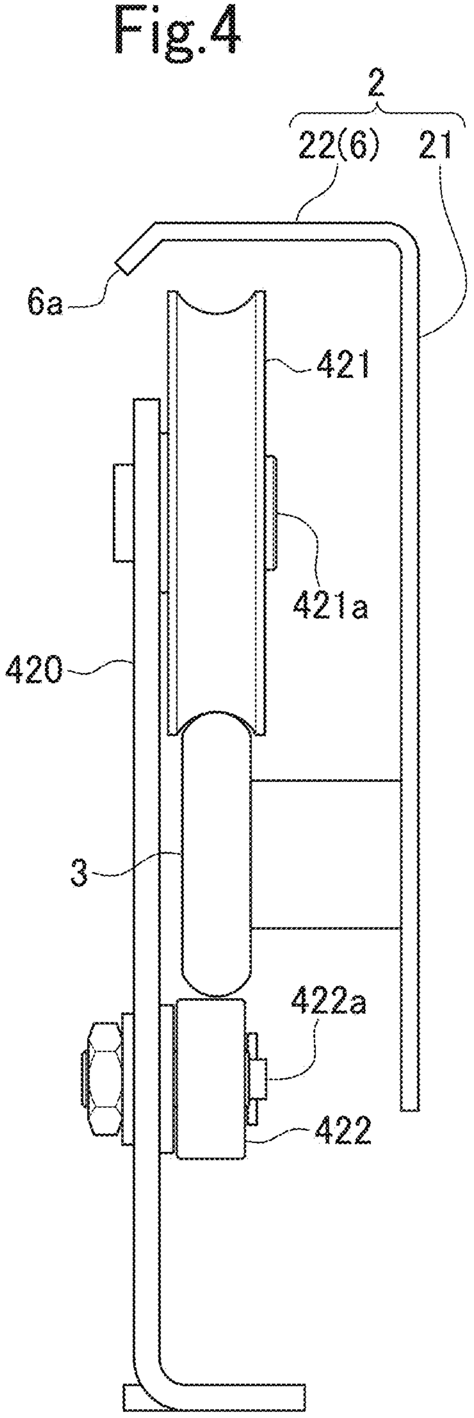
FIG. 4 is a view showing a configuration of a wear-debris adhesion suppression part, a door rail, a first roller, and their vicinities according to another embodiment as viewed from the opening and closing direction.
Figure 5:
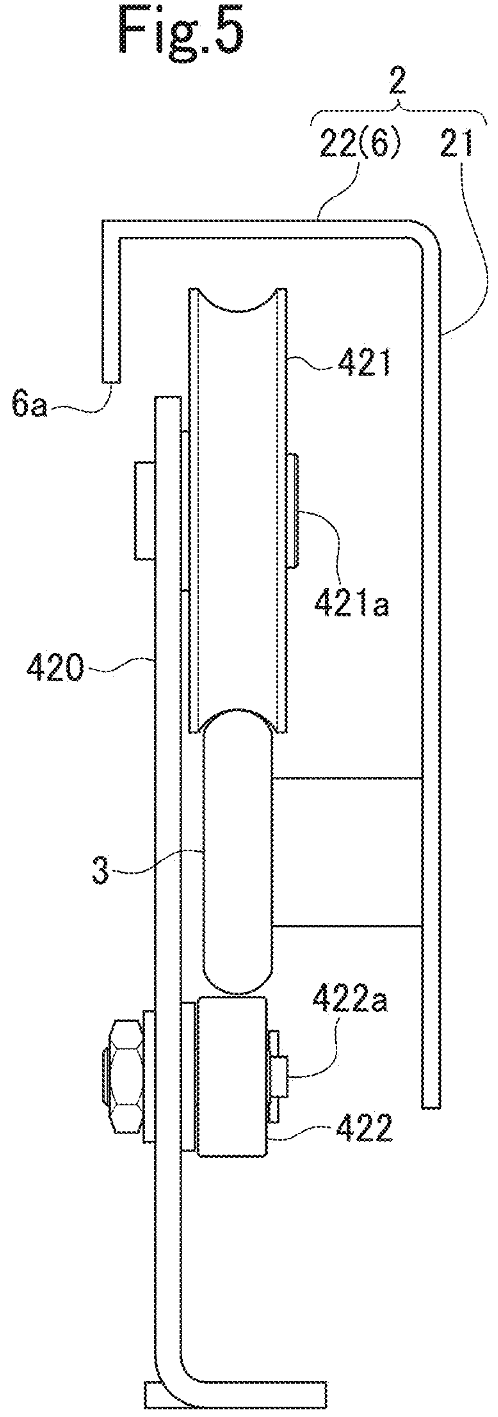
FIG. 5 is a view showing a configuration of a wear-debris adhesion suppression part, a door rail, a first roller, and their vicinities according to another embodiment as viewed from the opening and closing direction.

The wear-debris adhesion suppression part 6 of the aforementioned embodiment extends straight from the first part 21 in the entrance direction, but not limited to this configuration. As shown in FIG. 3 to FIG. 5, a distal end part in the entrance direction (i.e., the first rotary shaft 421*a* direction) of the wear-debris adhesion suppression part 6 (i.e., the second part 22) can extend downward or extends in an inclined direction in which the distal end part is inclined downward as it goes toward a distal side. With the wear-debris adhesion suppression part 6 having the distal end in the entrance direction thus extending downward or in the inclined direction (i.e., obliquely downward direction), wear debris, for example, falling from the endless belt 55 is more unlikely to reach the door rail 3 and the rollers 421, 422 located below the endless belt 55, and it is possible to more effectively suppress the adhesion of the wear debris to the door rail 3 and the rollers 421, 422.

In this case, a distal end 6*a* of the wear-debris adhesion suppression part 6 is preferably located at an upper end position of the first roller 421 or its vicinity in the vertical direction (see FIG. 4), further preferably located on the lower side of the upper end of the first roller 421 (see FIG. 5). The lower the distal end 6 *a* is positioned, the more difficult it becomes for wear debris, for example, falling from the endless belt 55 to reach (that is, adhere to) the door rail 3 and the first roller 421.

Figure 6:
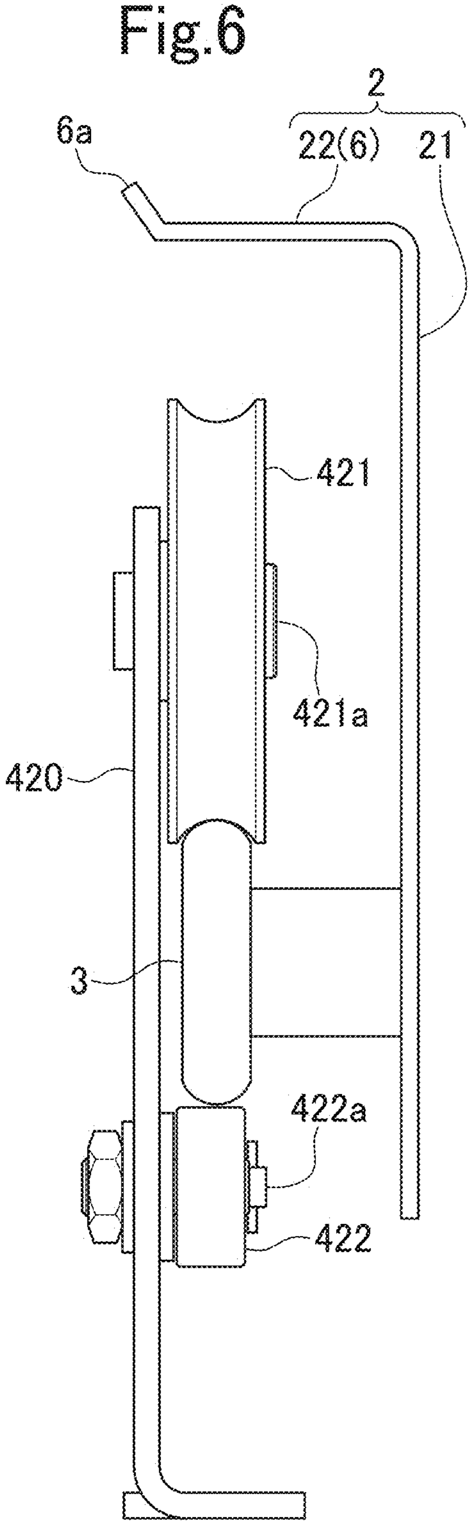
FIG. 6 is a view showing a configuration of a wear-debris adhesion suppression part, a door rail, a first roller, and their vicinities according to another embodiment as viewed from the opening and closing direction.
Figure 7:
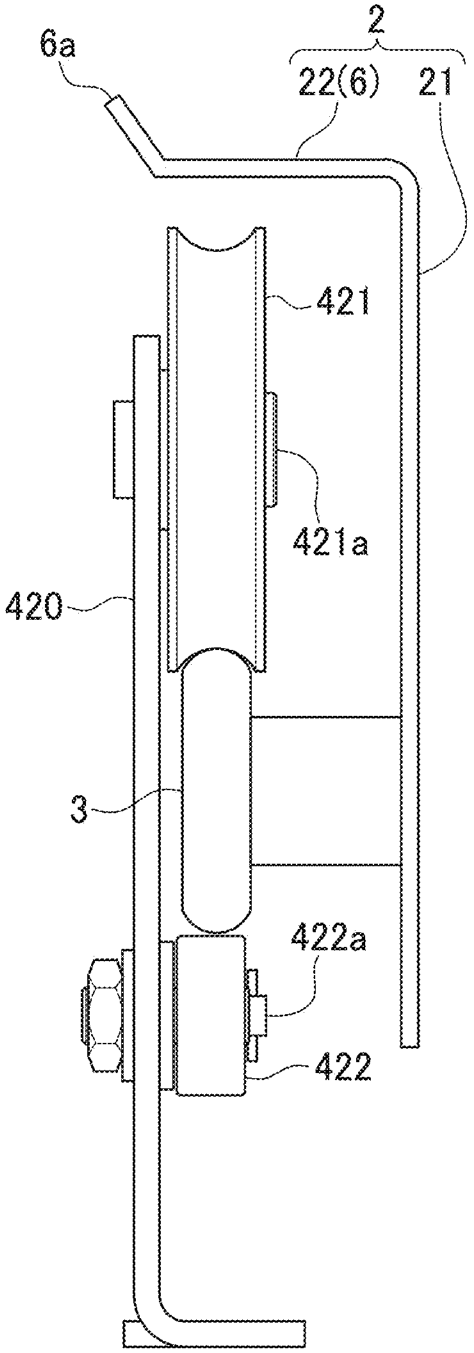
FIG. 7 is a view showing a configuration of a wear-debris adhesion suppression part, a door rail, a first roller, and their vicinities according to another embodiment as viewed from the opening and closing direction.
Figure 8:
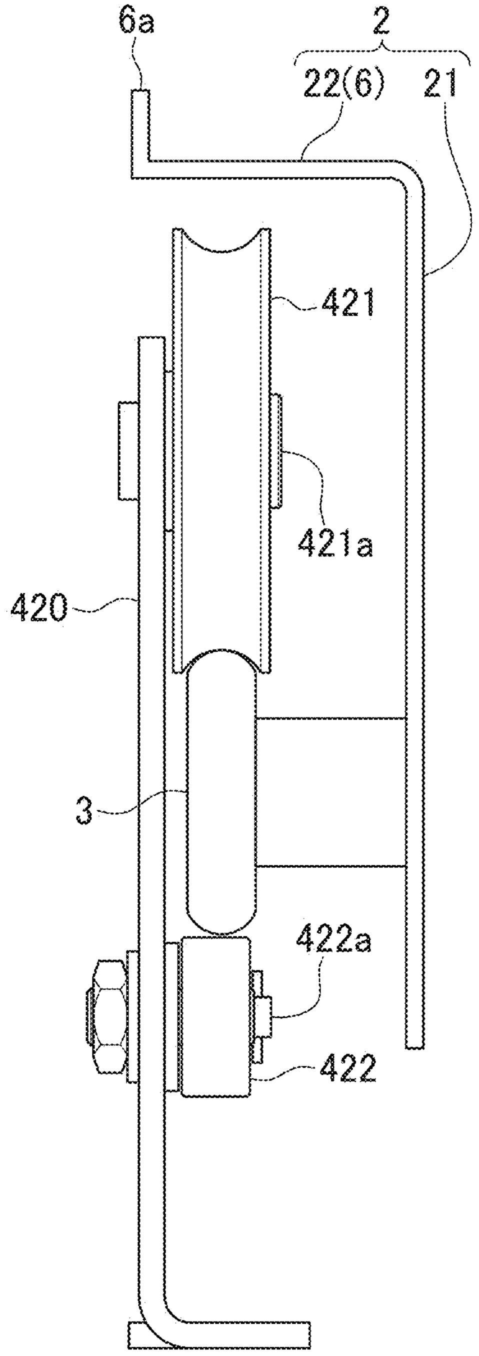
FIG. 8 is a view showing a configuration of a wear-debris adhesion suppression part, a door rail, a first roller, and their vicinities according to another embodiment as viewed from the opening and closing direction.

As shown in FIG. 6 to FIG. 8, the distal end part in the entrance direction of the wear-debris adhesion suppression part 6 can extend upward or extend in an inclined direction in which the distal end part is inclined upward as it goes toward the distal side. With the wear-debris adhesion suppression part 6 having the distal end part in the entrance direction thus extending in the upward direction or in the inclined direction (i.e., obliquely upward direction), it is possible to allow wear debris, for example, falling from the endless belt 55 to accumulate (i.e., to be held) on the wear-debris adhesion suppression part 6, and hence suppress wear debris from falling in, for example, the elevator shaft.

Figure 9:
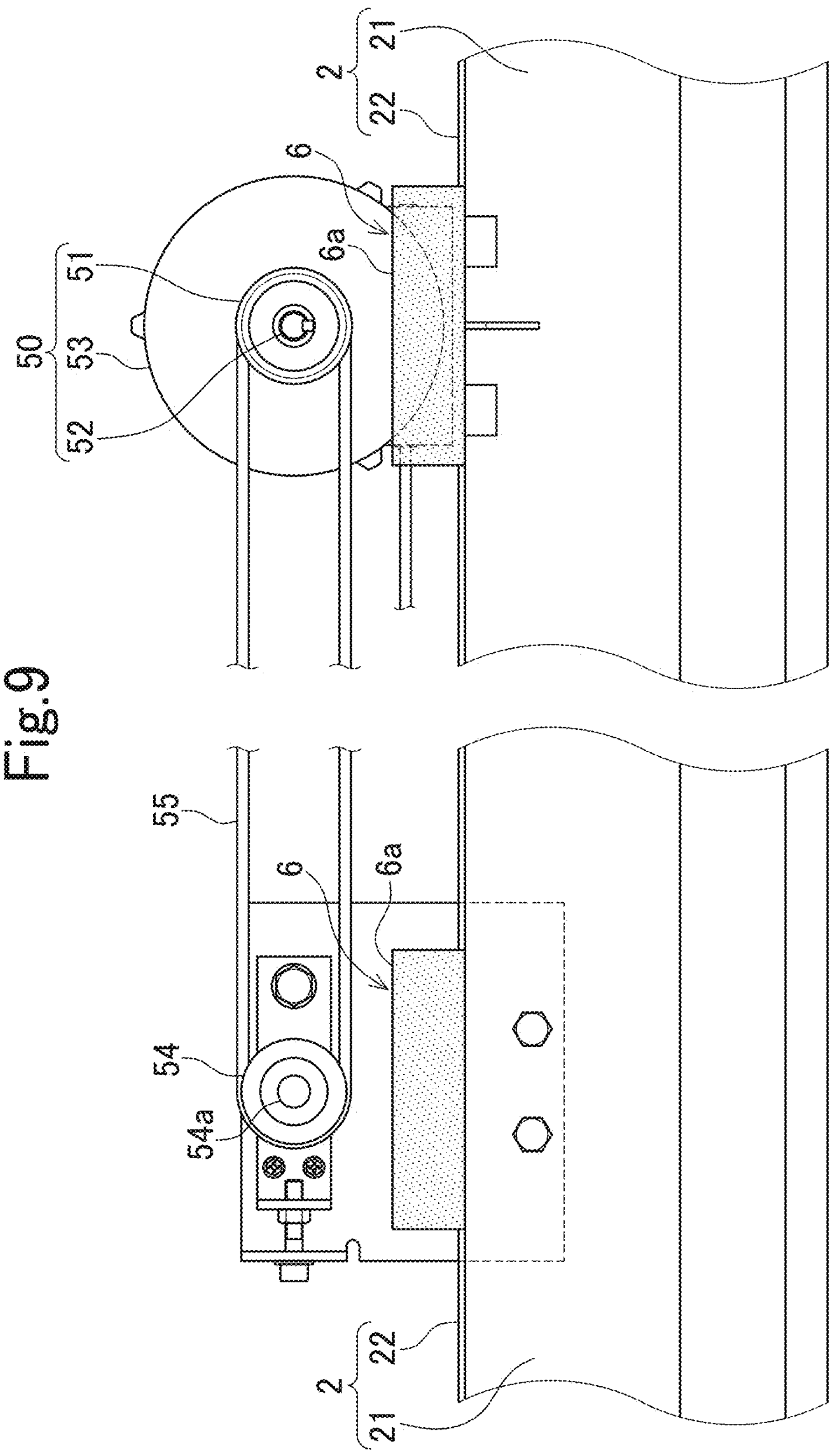
FIG. 9 is a view showing a configuration of a wear-debris adhesion suppression part and its vicinity according to another embodiment as viewed from the entrance direction of the car.
Figure 10:
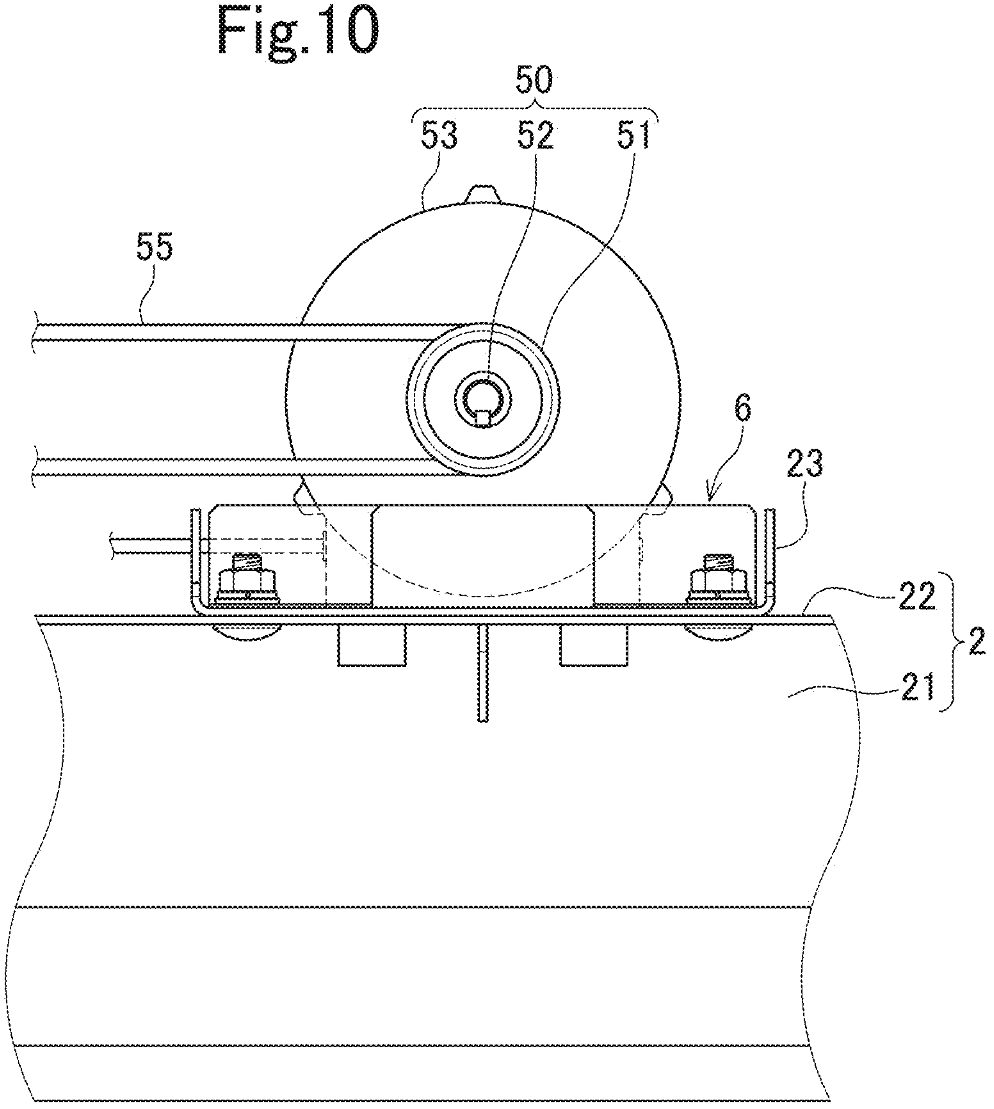
FIG. 10 is a view showing a configuration of a wear-debris adhesion suppression part and its vicinity according to another embodiment as viewed from the entrance direction.
Figure 11:
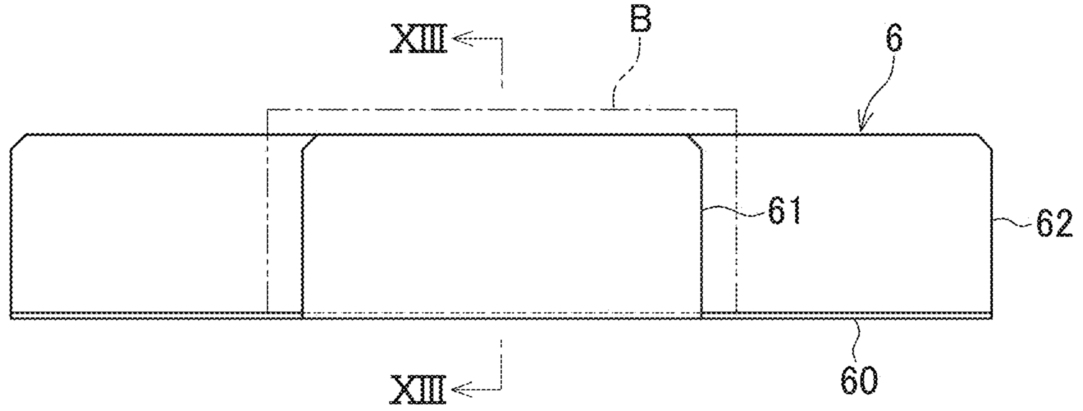
FIG. 11 is a view of the wear-debris adhesion suppression part as viewed from the entrance direction.
Figure 12:
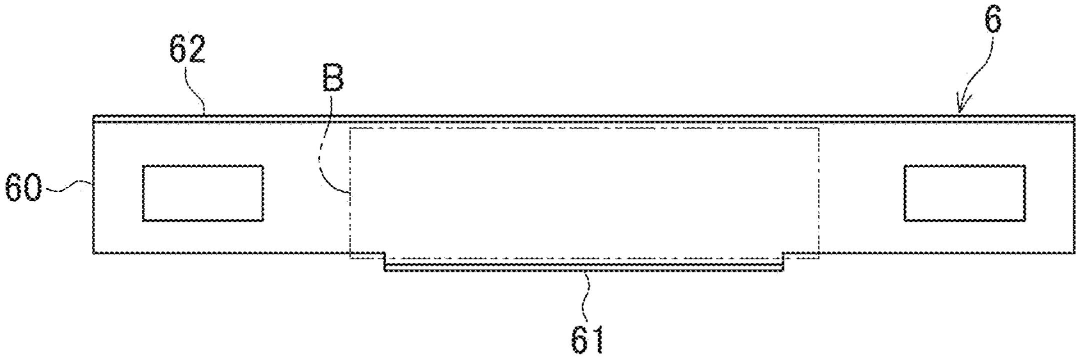
FIG. 12 is a view of the wear-debris adhesion suppression part as viewed from above.
Figure 13:
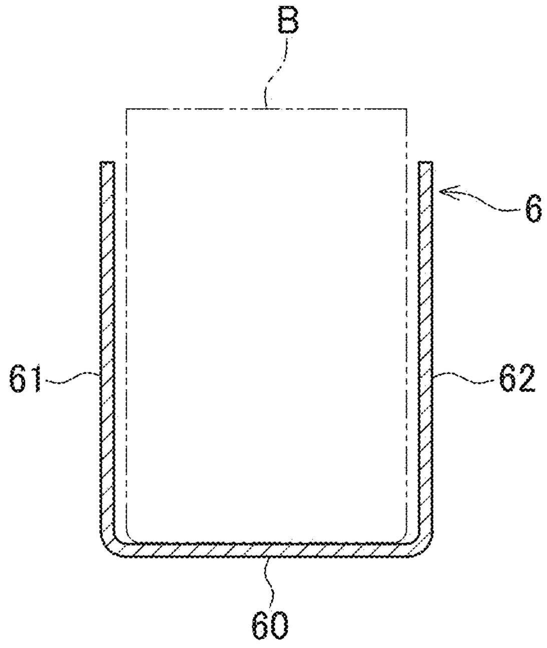
FIG. 13 is a cross sectional view taken along the line and viewed in the direction of arrows XIII-XIII in FIG. 11.
Figure 14:
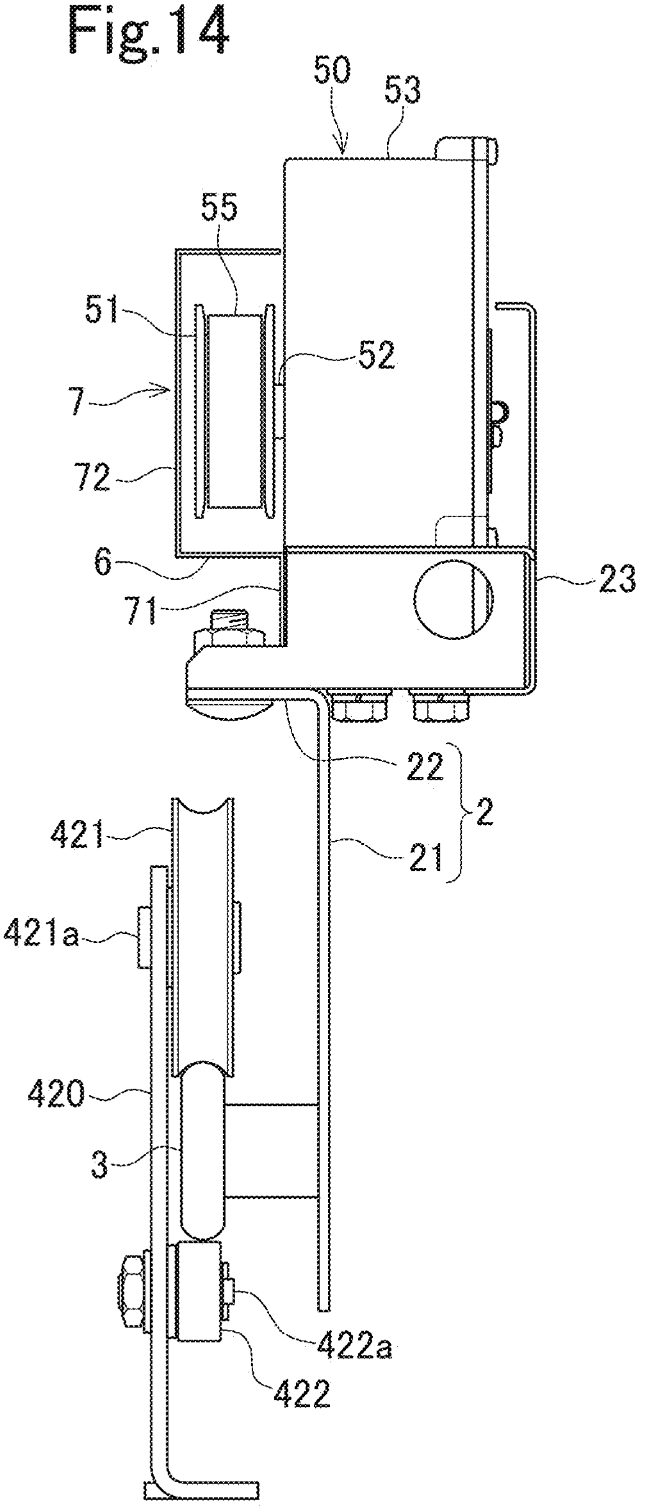
FIG. 14 is a view showing a configuration of a cover member and its vicinity as viewed from the opening and closing direction.
Figure 15:
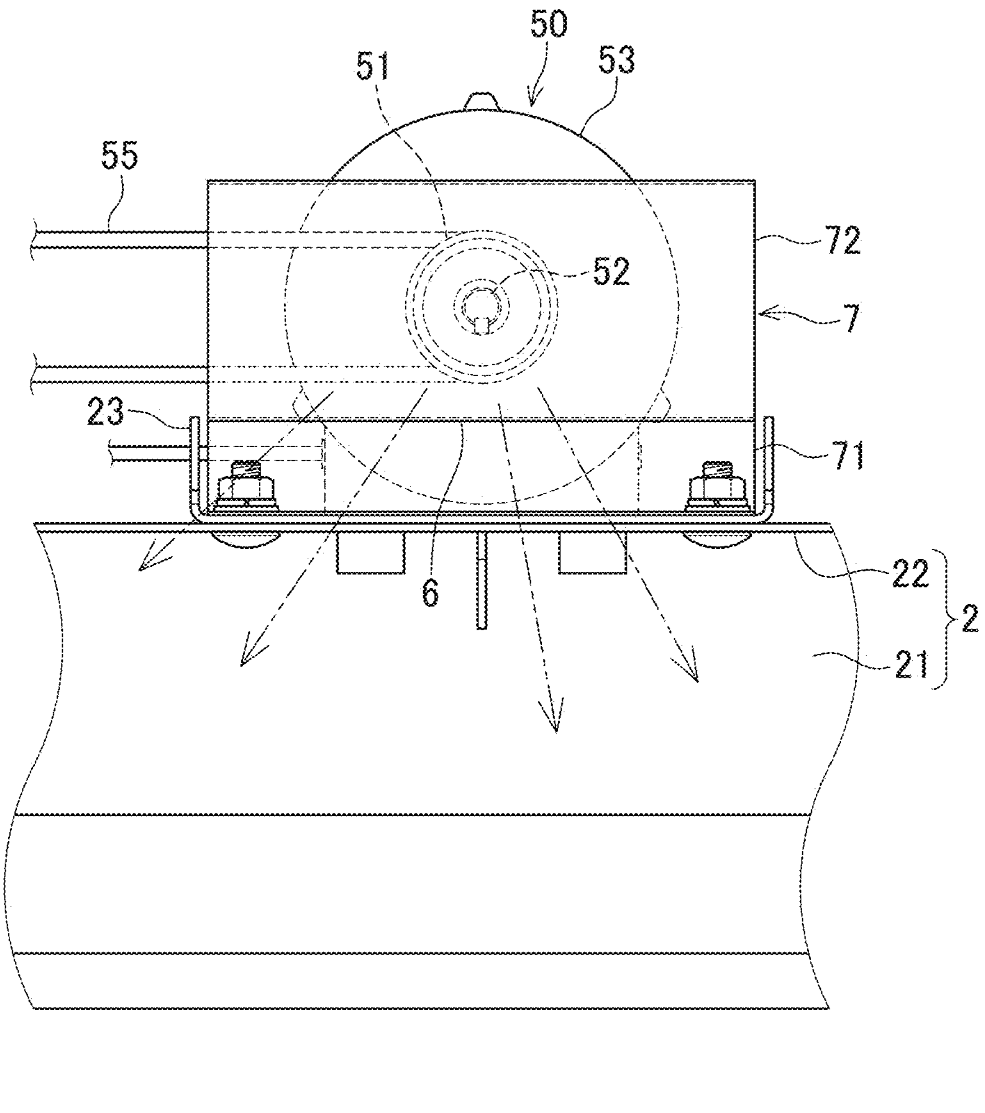
FIG. 15 is a view showing the configuration of the cover member and its vicinity as viewed from the entrance direction.
Figure 16:
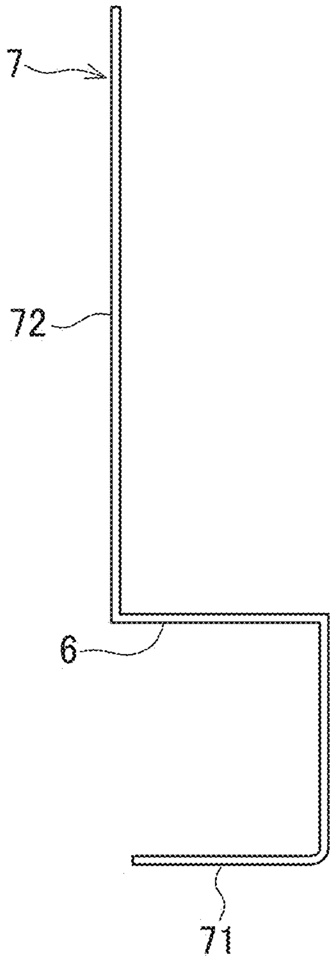
FIG. 16 is a view showing a cover member according to another embodiment as viewed from the opening and closing direction.
Figure 17:
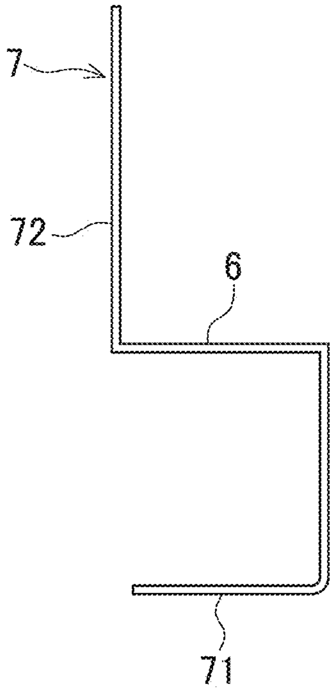
FIG. 17 is a view showing a cover member according to another embodiment as viewed from the opening and closing direction.

As described above, the distal end part in the entrance direction of the wear-debris adhesion suppression part 6 extends in the upward direction or in the inclined direction in which the distal end part is inclined upward as it goes toward the distal side. In this configuration, the wear-debris adhesion suppression part 6 can be disposed (i.e., formed) only at the position corresponding to each of the pulleys 51, 54 (i.e., dotted parts in FIG. 9) in the opening and closing direction, as shown in FIG. 9.

The wear-debris adhesion suppression part 6 can be configured to allow, for example, a container B being open upward to be mounted thereon, as shown in FIG. 10 to FIG. 13. Specifically, the wear-debris adhesion suppression part 6 has a bottom wall 60 extending in the horizontal direction, a front wall 61 extending upward from an end edge of the bottom wall 60 on one side in the entrance direction, and a rear wall 62 extending upward from an end edge of the bottom wall 60 on the other side in the entrance direction.

The bottom wall 60 is a part fixed to the frame member 2 (more specifically, the second part 22) and having a rectangular plate shape elongated in the opening and closing direction in plan view. The front wall 61 has a rectangular plate shape elongated in the opening and closing direction as viewed from the entrance direction. The size of the front wall 61 in the opening and closing direction is smaller than that of the bottom wall 60 in the opening and closing direction, and the front wall 61 is located in a central part in the opening and closing direction of the bottom wall 60. The rear wall 62 has a rectangular plate shape elongated in the opening and closing direction as viewed from the entrance direction, and the size of the rear wall 62 in the opening and closing direction is the same as that of the bottom wall 60 in the opening and closing direction.

According to this configuration, wear debris, for example, falling from the endless belt 55 can be accumulated in the container B. Further, the use of the container B can facilitate the disposal of the wear debris. In this case, it is preferable that the wear-debris adhesion suppression part 6 be configured to hold the container B.

In the door device 1 of the aforementioned embodiment, the wear-debris adhesion suppression part 6 is disposed on the upper end part of the frame member 2, but not limited to this configuration. The wear-debris adhesion suppression part 6 can be configured, for example, to be disposed between the drive pulley 51 and the upper end of the frame member 2 in the vertical direction, as shown in FIG. 14 to FIG. 19. Examples will be provided below.

It can be configured such that the door device 1 includes a cover member 7 attached to the motor part 50, and a part of or the entire cover member 7 forms the wear-debris adhesion suppression part 6. Specifically, this cover member 7 has a fixing part 71 for fixing the cover member 7 to the motor part 50 or the frame member 2, the wear-debris adhesion suppression part 6, and a scattering prevention part 72 for preventing the scattering of the wear debris in the entrance direction.

The fixing part 71 is fixed to the frame member 2, the second bracket 23, or a casing of the motor 53 by a fastening member such as a bolt, welding, or the like.

Figure 18:
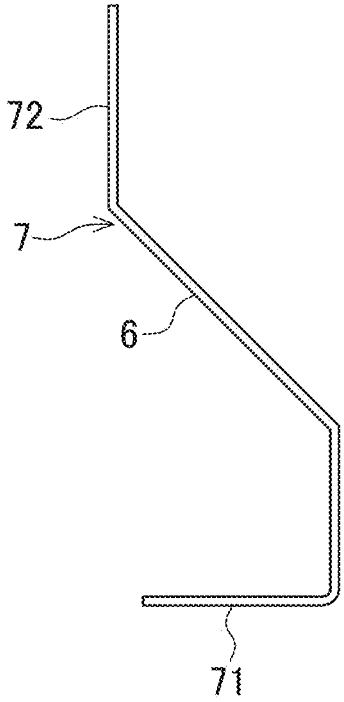
FIG. 18 is a view showing a cover member according to another embodiment as viewed from the opening and closing direction.
Figure 19:
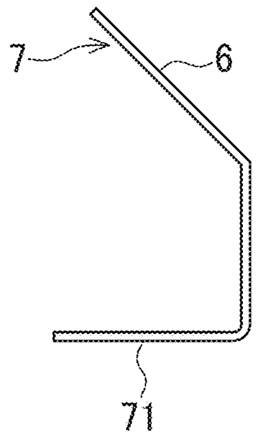
FIG. 19 is a view showing a cover member according to another embodiment as viewed from the opening and closing direction.

The wear-debris adhesion suppression part 6 is a plate-shaped part extending from the upper end of the fixing part 71, and can extend in the entrance direction as viewed from the opening and closing direction (see FIG. 14, FIG. 16, FIG. 17) or can extend in the inclined direction (i.e., obliquely upward direction) in which the wear-debris adhesion suppression part is inclined upward as it goes toward the distal side (see FIG. 18, FIG. 19). The cover member 7 can be provided with no scattering prevention part 72. That is, the cover member 7 can be formed of the fixing part 71 and the wear-debris adhesion suppression part 6.

The wear-debris adhesion suppression part 6 thus located in vicinity to the drive pulley 51 in the vertical direction makes it possible to block wear debris which has, for example, fallen from the endless belt 55 from moving toward the door rail 3 and the first roller 421 immediately (that is, before the falling area of the wear debris is increased), and thus more appropriately suppress the adhesion of the wear debris to the door rail 3 and the first roller 421.

It is not necessary that the wear-debris adhesion suppression part 6 is formed of only the single member, that is, only a part 22 of the frame member, or only a part 6 of the cover member. For example, the wear-debris adhesion suppression part 6 can include both of the part 22 of the frame member 2 and the part 6 of the cover member 7.

In the door device 1 of the aforementioned embodiment, the endless belt 55 is a toothed belt, but not limited to this configuration. The endless belt 55 can be any other belt such as a V belt.

Figure 20:
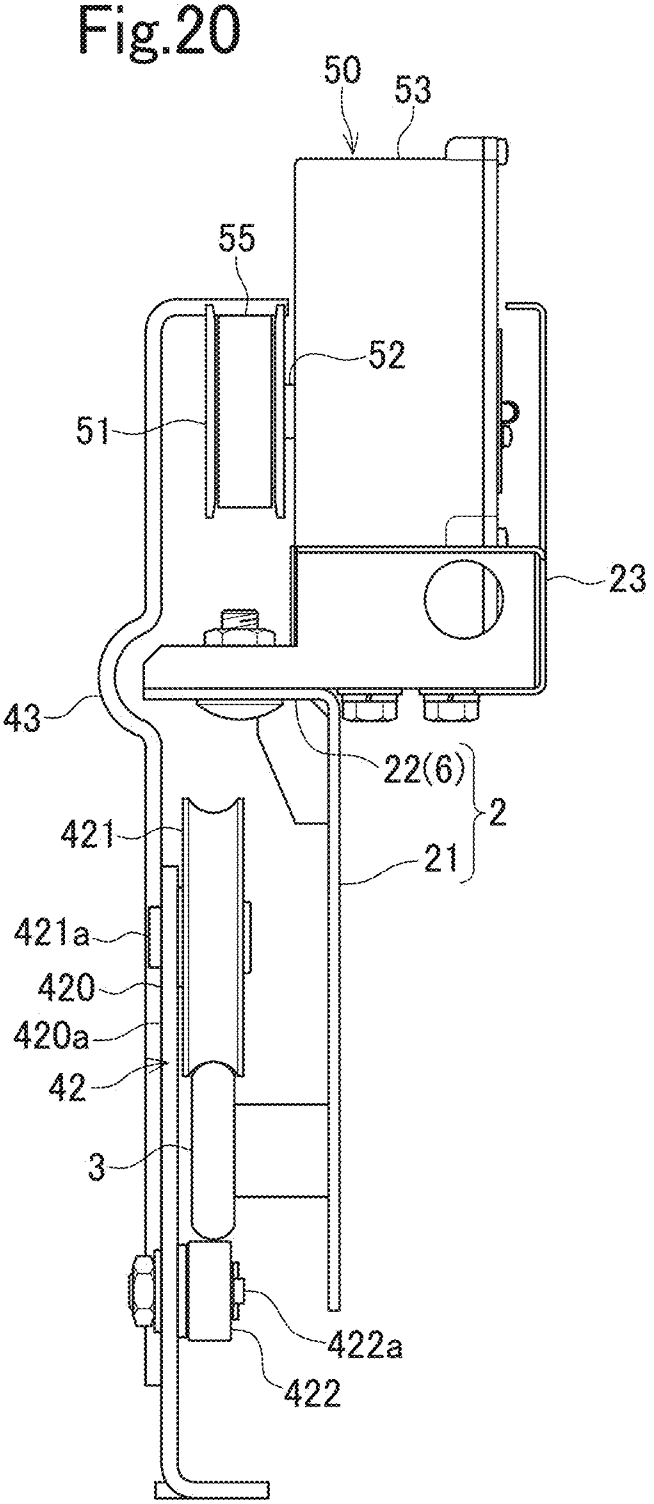
FIG. 20 is a view showing a configuration of a first bracket and its vicinity according to another embodiment as viewed from the opening and closing direction.
Figure 21:
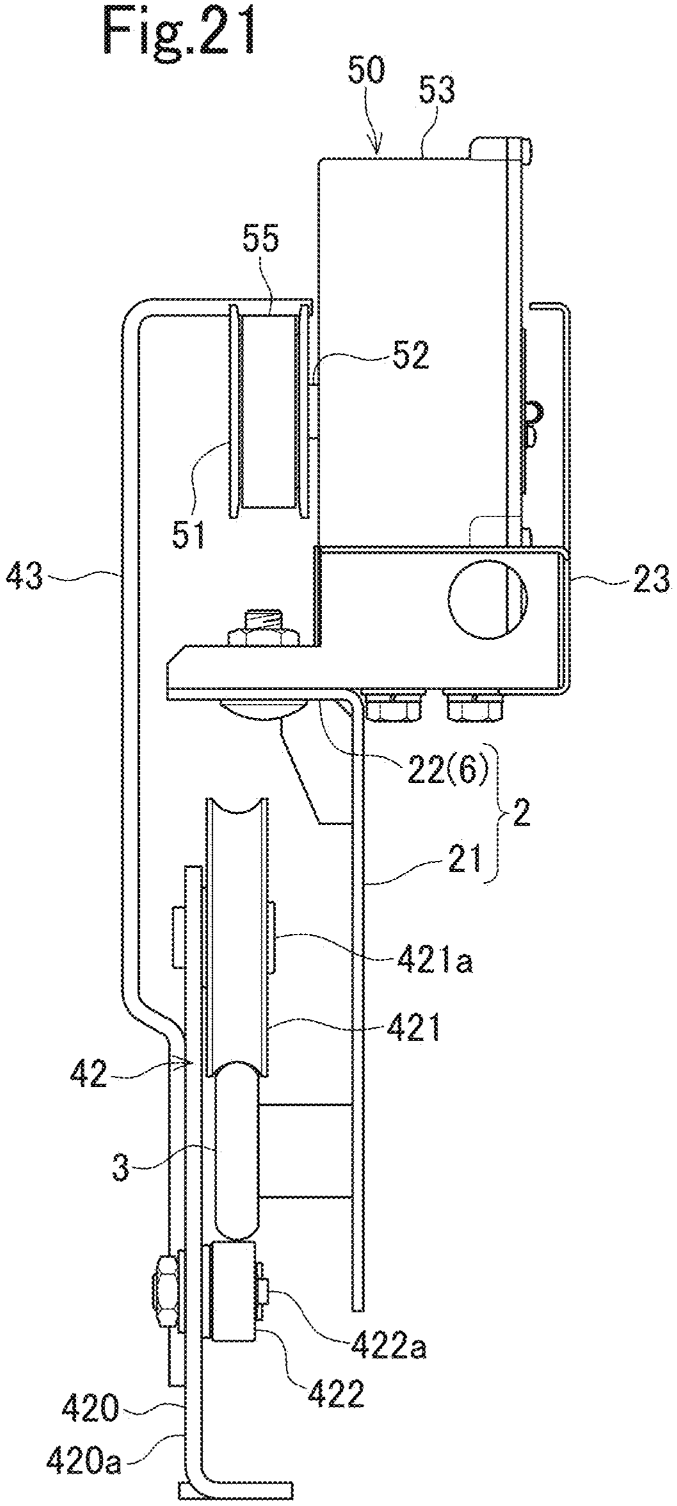
FIG. 21 is a view showing a configuration of a first bracket and its vicinity according to another embodiment as viewed from the opening and closing direction.
Figure 22:
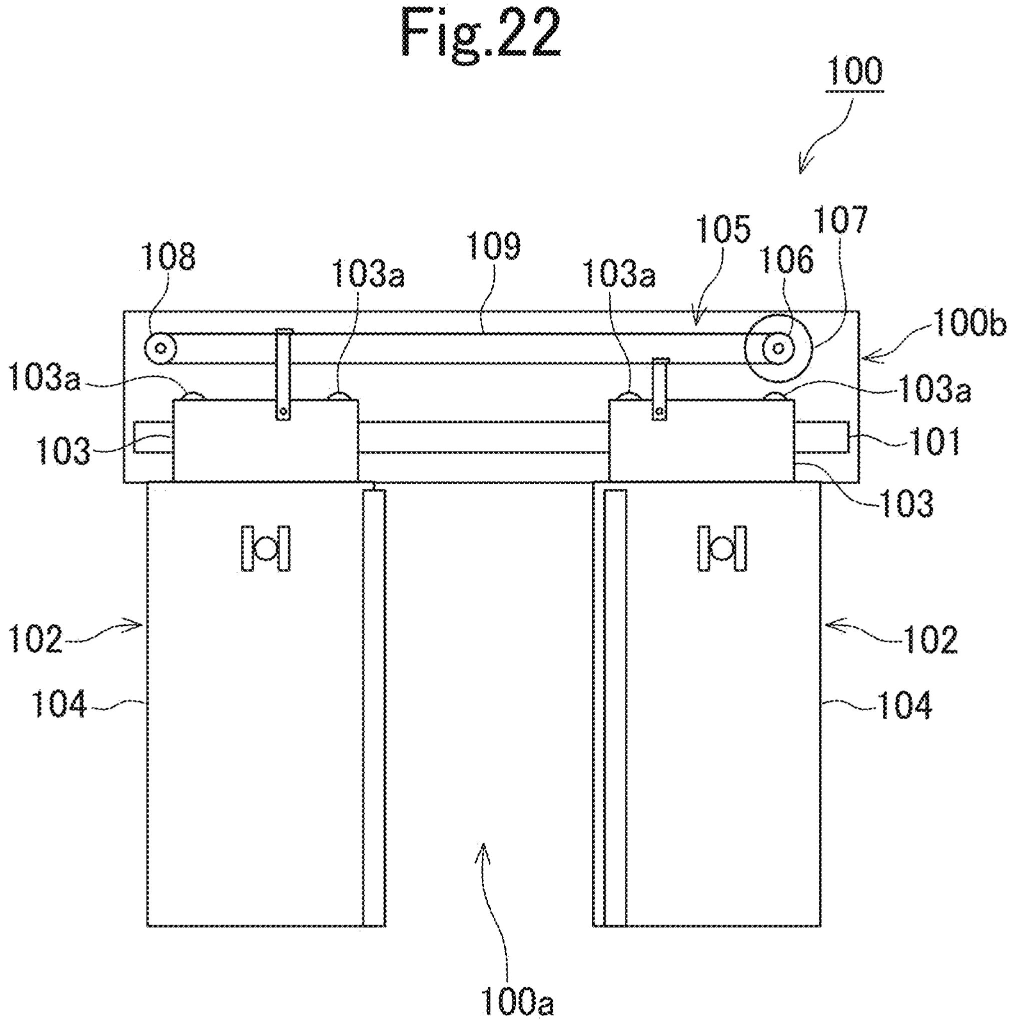
FIG. 22 is a schematic view showing a configuration of a conventional elevator door device.

In the door device 1 of the aforementioned embodiment, the first bracket 43 connecting the hanger body 420 to the endless belt 55 extends straight upward from a one side surface 420*a* of the hanger body 420 (see FIG. 1 and FIG. 2), but not limited to this configuration. As shown in FIG. 20, the first bracket 43 can be, for example, bent so as to project to one side in the entrance direction (i.e., the left side in FIG. 20) at a position corresponding to the wear-debris adhesion suppression part 6 (i.e., the second part 22) in the vertical direction. The first bracket 43 can extend upward at a distance from the one side surface 420*a* of the hanger body 420 on one side in the entrance direction (see FIG. 21). With this configuration, a size for the wear-debris adhesion suppression part 6 in the entrance direction can be easily secured.

The elevator door device of the present embodiment are as described above. However, the present invention is not limited thereto, and the design can be appropriately modified within the scope intended by the present invention. The operational advantage of the present invention is also not limited to the foregoing embodiments. That is, the embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An elevator door device comprising:

a door rail extending in an opening and closing direction of a door panel;

a door part including the door panel and a roller that is rotatable around a rotary shaft that extends orthogonal to the opening and closing direction and in a horizontal direction, the door part configured to move in the opening and closing direction by rolling of the roller on the door rail;

a door drive part for driving the door part in the opening and closing direction;

a wear-debris adhesion suppression part that extends in the opening and closing direction; and a frame member extending in the opening and closing direction, wherein the door drive part comprises:

a motor part including a drive pulley and configured to drive to rotate the drive pulley;

a driven pulley disposed apart from the drive pulley in the opening and closing direction; and an endless belt that is wound around the drive pulley and the driven pulley, and to which the door part is connected, the door rail is located below the drive pulley as viewed from the opening and closing direction, the wear-debris adhesion suppression part is disposed between the drive pulley, and the door rail and the roller, as viewed from the opening and closing direction and disposed at a position corresponding to the drive pulley in the opening and closing direction, the frame member has:

a first part extending in a plane direction orthogonal to the rotary shaft direction of the roller and having a surface on one side in the rotary shaft direction on which the door rail is disposed; and a second part extending from an upper end of the first part toward the surface on the one side in the rotary shaft direction and extending in the opening and closing direction, the second part forms the wear-debris adhesion suppression part, and a distal end part in the rotary shaft direction of the second part extends in a lower direction or extends in an inclined direction in which the distal end part is inclined downward as the distal end part goes toward a distal side.

2. The elevator door device according to claim 1, wherein the wear-debris adhesion suppression part has a size in a rotary shaft direction of the roller large enough to cover the door rail and the roller when viewed downward from a position of the drive pulley.

3. The elevator door device according to claim 1, further comprising a frame member extending in the opening and closing direction, wherein the motor part is disposed on an upper end part of the frame member, and the wear-debris adhesion suppression part is disposed between the drive pulley and the upper end of the frame member in a vertical direction.

* * * * *